United States Patent [19]

De Paul et al.

[11] Patent Number: 5,708,702
[45] Date of Patent: Jan. 13, 1998

[54] DYNAMIC STP ROUTING IN RESPONSE TO TRIGGERING

[75] Inventors: Kenneth E. De Paul, Wake Forest, N.C.; Robert D. Farris, Sterling, Va.

[73] Assignee: Bell Atlantic Network Services, Inc., Arlington, Va.

[21] Appl. No.: 508,507

[22] Filed: Jul. 28, 1995

[51] Int. Cl.[6] .............................. H04M 7/00; H04M 3/42; H04J 3/12; H04Q 11/04
[52] U.S. Cl. .......................... 379/230; 370/426; 379/207; 379/220; 379/229
[58] Field of Search ..................... 379/201, 207, 379/219, 220, 229, 230; 370/426

[56] References Cited

U.S. PATENT DOCUMENTS

| | | | |
|---|---|---|---|
| 5,206,899 | 4/1993 | Gupta | 379/120 |
| 5,222,128 | 6/1993 | Daly et al. | 379/221 |
| 5,247,571 | 9/1993 | Kay et al. | 379/112 X |
| 5,311,572 | 5/1994 | Friedes et al. | 379/67 |
| 5,481,603 | 1/1996 | Gutierrez et al. | 379/201 X |

*Primary Examiner*—Harry S. Hong
*Attorney, Agent, or Firm*—Lowe, Price, LeBlanc & Becker

[57] ABSTRACT

An off-board or remote database controls routing of out-of-band signaling messages through signaling transfer points (STPs). The preferred embodiment relates to improvements in an SS7 common channel interoffice signaling system which transports routing control type signaling messages and the like between switching offices of a public switched telephone network. At least one STP is programmed to recognize certain aspects of a signaling message as a 'point in routing' (PIR) which triggers a database query or 'dip' to the remote database. The database provides an instruction to the STP as to how to translate and/or route the particular signaling message. The signaling message routing information in the database may be extremely dynamic, for example varying with time of day, point-of-origin, traffic congestion, etc.

31 Claims, 9 Drawing Sheets

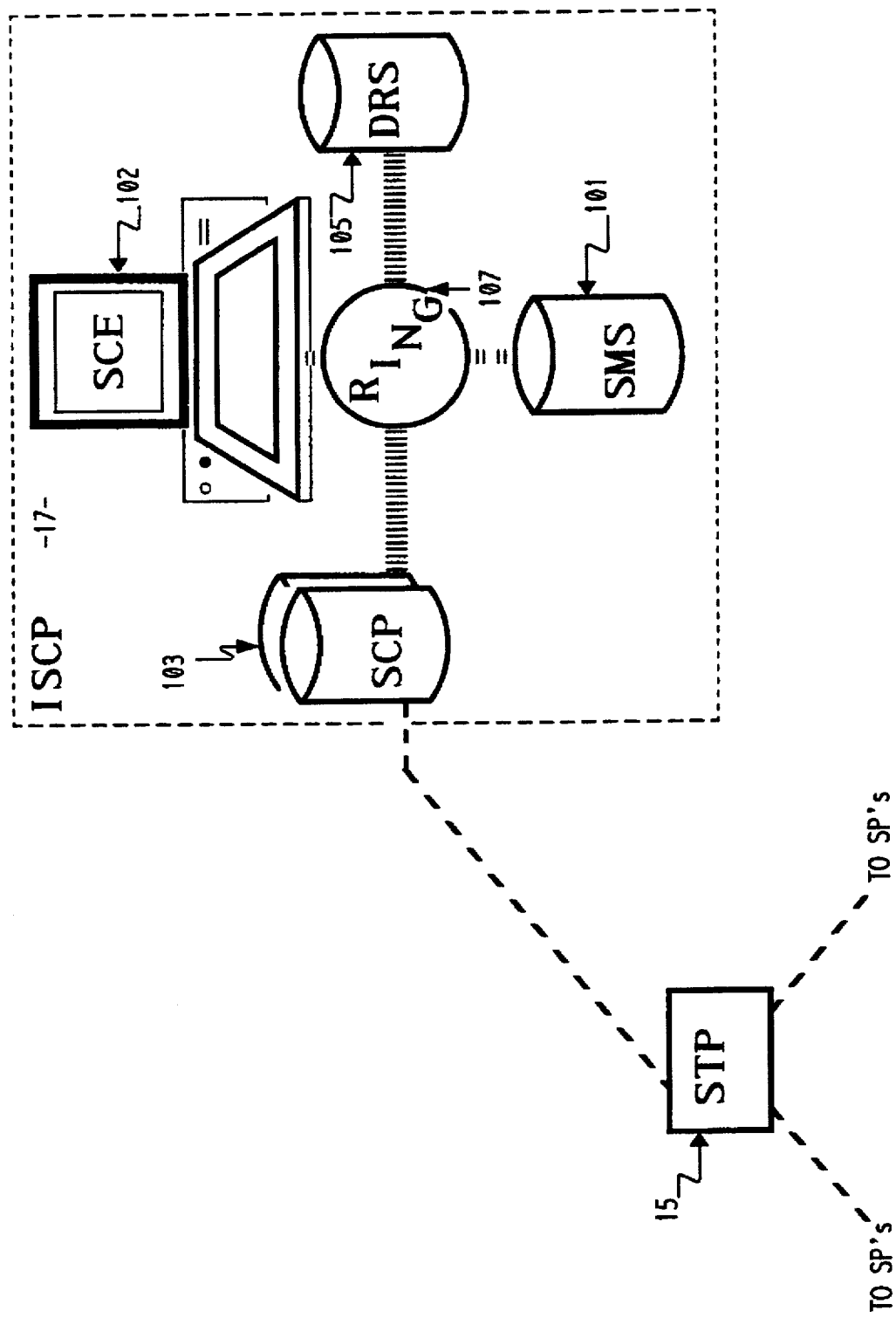

DYNAMIC STP ROUTING IN RESPONSE TO TRIGGERING

TECHNICAL FIELD

The present invention relates to a Common Channel Interoffice Signaling system, a packet switching system used therein as a signal transfer point and methods of operation thereof for dynamically routing out-of-band signaling data messages.

1. Acronyms

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
Advanced Intelligent Network (AIN)
Answer Message (ANM)
Application Service Part (ASP)
Backward Indicator Bit (BIB)
Backward Sequence Number (BSN)
Central Office (CO)
Common Channel Signalling (CCS)
Common Channel Interoffice Signalling (CCIS)
Customer Identification Code (CIC)
Cyclic Redundancy Code (CRC)
Data and Reporting System (DRS)
Destination Point Code (DPC)
Dual Tone Multifrequncy (DTMF)
Fill in Signal Unit (FISU)
Global Title (GTT)
Initial Address Message (IAM)
Integrated Service Control Point (ISCP)
Integrated Services Digital Network (ISDN)
ISDN User Part (ISDN-UP)
International Standards Organization (ISO)
Link Service Signaling Unit (LSSU)
Local Access and Transport Area (LATA)
Message Signaling Unit (MSU)
Message Transfer Part (MTP)
Multi-Services Application Platform (MSAP)
Open Systems Interconnection (OSI)
Operations, Maintenance, Application Part (OMAP)
Origination Point Code (OPC)
Point in Call (PIC)
Point in Routing (PIR)
Point of Presence (POP)
Recent Change (RC)
Service Control Point (SCP)
Service Creation Environment (SCE)
Service Information Octet (SIO)
Service Management System (SMS)
Service Switching Point (SSP)
Signaling Connection Control Part (SCCP)
Signaling Link Selection (SLS)
Signaling System 7 (SS7)
Signaling Point (SP)
Signaling Transfer Point (STP)
Subsystem Number (SSN)
Time Slot Interchange (TSI)
Transaction Capabilities Applications Protocol (TCAP)

2. Background Art

All telecommunications systems having multiple switching offices require signaling between the offices. The classic example relates to telephone networks. Telephone networks require signaling between switching offices for transmitting routing and destination information, for transmitting alerting messages such as to indicate the arrival of an incoming call, and for transmitting supervisor information, e.g. relating to line status. Signaling between offices can use 'in-band' transport or 'out-of-band' transport.

In-band signaling utilizes the same channel that carries the communications of the parties. In a voice telephone system, for example, one of the common forms of in-band signaling between offices utilizes multi-frequency signaling over voice trunk circuits. The same voice trunk circuits also carry the actual voice traffic between switching offices. In-band signaling, however, tends to be relatively slow and ties up full voice channels during the signaling operations. In telephone call processing, a substantial percentage of all calls go unanswered because the destination station is busy. For in-band signaling, the trunk to the end office switching system serving the destination is set-up and maintained for the duration of signaling until that office informs the originating office of the busy line condition. As shown by this example, in-band signaling greatly increases congestion on the traffic channels, that is to say, the voice channels in the voice telephone network example. In-band signaling also is highly susceptible to fraud because hackers have developed devices which mimic in-band signaling.

Out-of-band signaling evolved to mitigate the problems of in-band signaling. Out-of-band signaling utilizes separate channels, and in many cases separate switching elements. As such, out-of-band signaling reduces congestion on the channels carrying the actual communication traffic. Also, messages from the end users always utilize an in-band format and remain in-band, making it virtually impossible for an end user to simulate signaling messages which ride on an out-of-band channel or network. Out-of-band signaling utilizes its own signal formats and protocols and is not constrained by protocols and formats utilized for the actual communication, therefore out-of-band signaling typically is considerably faster than in-band signaling.

Out of band signaling networks typically include data links and one or more packet switching systems. Out-of-band signaling for telephone networks is often referred to as Common Channel Signaling (CCS) or Common Channel Interoffice Signaling (CCIS). Most such signaling communications for telephone networks utilizes signaling system 7 (SS7) protocol. An SS7 compliant CCIS network comprises data switching systems designated Signal Transfer Points (STPs) and data links between the STPs and various telephone switching offices of the network. In advanced versions of the telephone network including high level control nodes, identified as Service Control Points (SCPs) or Integrated Service Control Points (ISCPs), the CCIS network also includes data links connecting the high level control nodes to one or more of the STPs.

The STPs are program controlled packet data switching systems. In operation, an STP will receive a packet data message from another node of the network, for example from an end office switching system. The STP analyzes point code information in the packet and routes the packet according to a translation table stored within the STP. This translation table is static. Any packet having a particular point code is output on a port going to the next CCIS signaling node specified by translation of that point code.

The static nature of the translation table of the STP makes use of that packet switching system rigid and makes operation difficult and time consuming to modify. A modification to the table, for example to route certain signaling messages through alternate links because a portion of the network is disabled, requires a substitution of the entire table relating to messages intended for the now disabled portion of the network.

For example, Daly et al. in U.S. Pat. No. 5,222,128 propose a disaster rerouting plan involving pre-planning of the re-routing of incoming customer calls to alternate business locations or to employees' homes. The pre-planning includes storing the local central office recent change (RC) messages necessary to implement the plan in text files and in executable data files. When the re-routing is invoked, the network service provider starts execution of the designated RC executable file and the data from the RC executable file thereby reroutes traffic. Daly et al. do not provide for rerouting of CCIS messages.

Also, as the telecommunication networks become increasingly complex and the volumes of traffic carried increase, the traffic on the CCIS network increases and the routing table maintained in each STP becomes larger. Maintenance and modification of the translation tables in the STPs is a difficult job requiring skilled technicians and programmers.

The development of the CCIS network has recently permitted the offering of a number of new service features provided by centralized program control from a high level control point. Such an enhanced telephone network is often termed an Advanced Intelligent Network (AIN). In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via the CCIS signaling network to an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call. An AIN type network for providing an Area Wide Centrex service was disclosed and described in detail in commonly assigned U.S. Pat. No. 5,247,571 to Kay et al., the disclosure of which is entirely incorporated herein by reference.

Existing AIN type systems, such as disclosed in the Kay et al. Patent, utilize the static routing functionality of the STPs in the CCIS network as described above. Every time a specified switching office launches a query for an identified ISCP, the translation table in the STP(s) of the CCIS network causes the STP(s) to route the query message to that ISCP.

There has been no modification of the STP functionality in light of the AIN routing methodology. For example, U.S. Pat. No. 5,206,899 to Gupta describes a method and apparatus for providing a service that allows a subscriber at any location to dynamically provision, i.e. assign personalized characteristics, including advanced billing options, and/or a set of custom features, to any "target station" which is an active phone accessible to a telecommunications network. The personalized characteristics all are loaded in the data base that controls the voice channel routing functionality.

Also, as part of the development of AIN, there have been proposals to access auxiliary databases. U.S. Pat. No. 5,311, 572 to Friedes et al., for example, teaches providing a customer database, essentially as a customer controlled extension of a network database maintained by the network service carrier. During call processing, a switch of the public network queries the carrier's database, and if necessary, the carrier's database obtains additional information from the customer's database. Consequently, the STP routes all queries to the carrier's data base, and that database must mediate access to the customer's data base and return the resultant instructions back through the STP to the switch that launched the particular query.

From the above discussion it becomes clear that a need exists for increased flexibility in the routing of signaling data messages through an out-of-band signaling network. The work to date on the AIN has not addressed this need.

DISCLOSURE OF THE INVENTION

The present invention meets the above noted needs by applying a dynamic routing functionality, similar to that used in AIN to route traffic information, to routing of signaling messages through an out-of-band signaling network, such as a CCIS network.

In one aspect the present invention relates to a method of routing a signaling message. A transfer point of a signaling network receives the signaling message from a node of the signaling network. The signaling message relates to control of a logically separate communication network. In a telephone system, for example, the signaling message rides on the SS7 common channel interoffice signaling network and relates to control of call set-up through the voice channels of the telephone network. In accord with the invention, routing data in a database separate from the transfer point is accessed, and the signal transfer point transmits the signaling message through the signaling network in accord with the routing information.

The dynamic routing functionality of the transfer point is triggered by occurrence of some predetermined event in the processing of a particular signaling message. Many signaling messages will not produce the predetermined event and will be routed normally utilizing routing control information stored in the transfer point. For those signaling messages producing the event, however, the transfer point will formulate a query message and transmit that message to the separate database. In response to the query, the database accesses stored information and, using that information, translates the query into actual routing control information. The database transmits a response message containing the routing control information back to the transfer point. The transfer point obtains the routing control information from the response message and uses that information to route the actual signaling message.

In an SS7 type signaling network, the predetermined event triggering the query by the transfer point typically relates to a routing parameter contained in a field of the signaling message. In the preferred embodiment, when a global title is present in the SS7 routing label, the transfer point executes a translation. For certain values of the global title, the transfer point uses internally stored data to perform the translation and control subsequent routing. For other values of the global title, the internal translation table holds a 'point in routing' (PIR) code which triggers the query to the remote database. In response to finding the PIR recorded in the internal table against the particular global title value, the transfer point uses routing control information obtained from the separate database to perform the actual translation and control subsequent routing.

In other aspects, the invention relates to a signaling transfer point and/or to specific networks implementing the dynamic signaling message routing functionality. For example, a signal transfer point in accord with the present invention includes interface modules, a data switch and a program controlled processor. The interface modules provide two-way data communications via interoffice signaling links. The switch routes signaling messages between the interface modules. The processor recognizes a predetermined event in the processing of a signaling message, obtains routing information from the separate database and controls routing of the message by the switch in accord with the information from the database.

A communication network in accord with the present invention includes local communication lines and at least one trunk circuit. Separately located central office switching systems, interconnected via the trunk circuit, selectively provide switched call connections between at least two of the local communication lines. A signaling transfer point in accord with the present invention routes signaling messages via signaling links coupled to the central office switching systems. The signaling links are separate from the local communication lines and the trunk circuit. The communication network also includes a database separate from the signaling transfer point and the central office switching systems. The database provides routing information to the signaling transfer point to control routing of at least some signaling messages by the signaling transfer point.

The preferred embodiment of the communication network is a public switched telephone network. The local communication lines are telephone lines, the trunk circuit is a telephone trunk, and the central office switching systems are end office and/or tandem office telephone switches. The preferred telephone network is an intelligent type network and includes a services control point, separate from the central office switching systems. The services control point communicates with the central office switching systems via signaling links and the signaling transfer point. The services control point includes a database storing call processing data associated with a plurality of the local communication lines for control of switched call connections through one or more of the central office switching systems.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 9 is a functional block diagram of the Integrated Service Control Point (ISCP).

BEST MODE FOR CARRYING OUT THE INVENTION

The present invention provides an off-board database dip for controlling routing of out-of-band signaling messages. The concepts of the present invention may apply to a variety of out-of-band signaling networks. The preferred embodiment, however, relates to improvements in an SS7 compliant common channel interoffice signaling system used in a public switched telephone network. In such an implementation, all signaling packets are routed through one or more Signaling Transfer Points (STPs). At least one STP is programmed to recognize certain aspects of a signaling message as a 'point in routing' (PIR) which triggers a database query or 'dip' to an off-board database separate from the STP.

The database provides an instruction to the STP as to how to route the particular signaling message. The signaling message routing information in the database may be extremely dynamic, for example varying with time of day, point-of-origin, traffic congestion, etc. For messages processed in this manner, modification of the STP routing functionality requires only a modification of the routing information in the database. Also, one database typically serves a number of STPs, permitting modification of the functionality of all of the STPs by modifying the data in a single database.

To facilitate understanding of the present invention, it will be helpful first to review the architecture and operation of a telephone network having CCIS capabilities.

Figure 1:
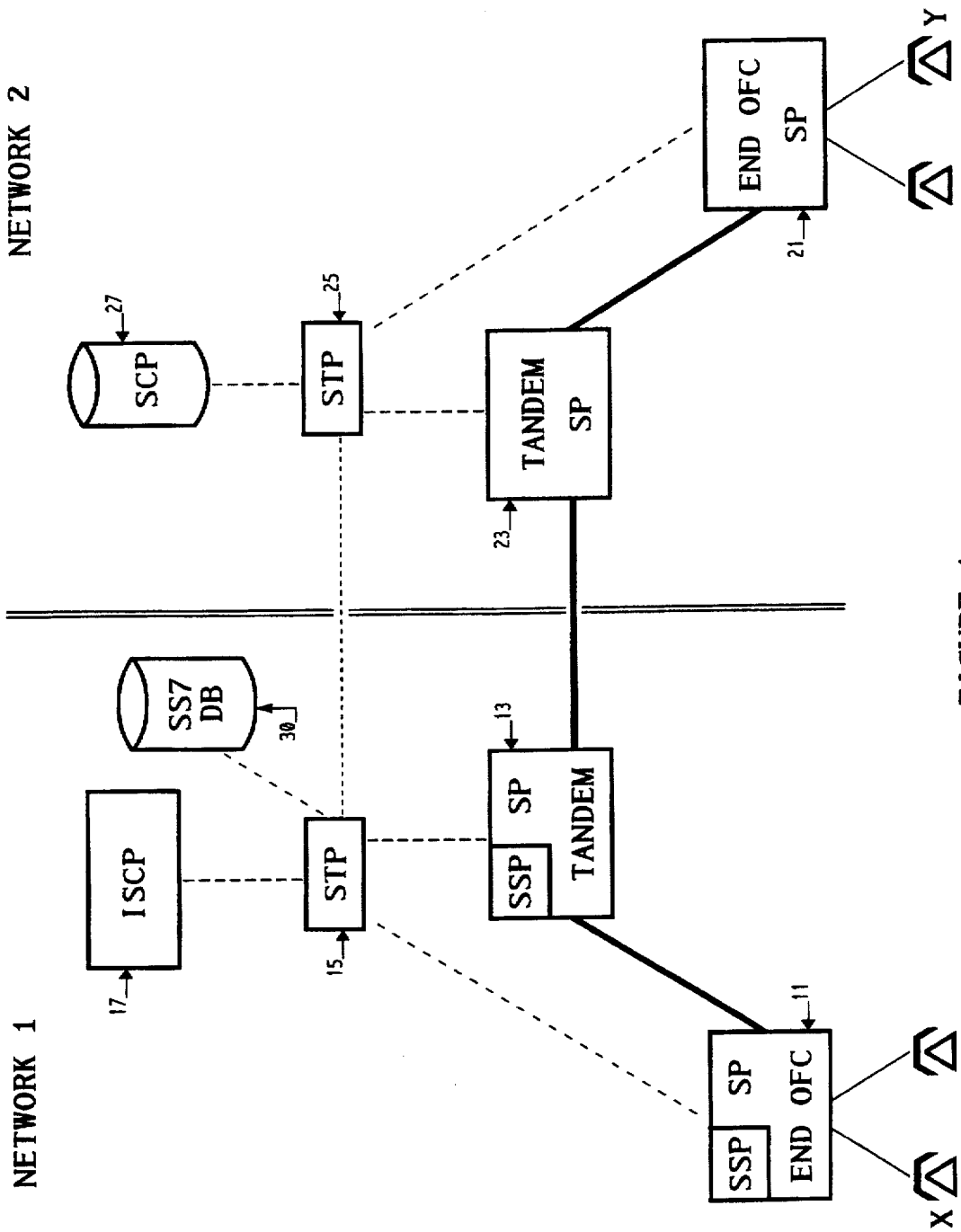
FIG. 1 is a simplified block diagram of a Public Switched Telephone Network and its SS7 signal control network, in accord with the present invention.

Referring to FIG. 1 there is shown a simplified block diagram of a switched traffic network and the common channel signaling network used to control the signaling for the switched traffic network. In the illustrated example, the overall network actually comprises two separate networks 1 and 2. As shown, these networks serve different regions of the country and are operated by different local exchange carriers. Alternatively, one network may be a local exchange carrier network, and the other network may comprise an interexchange carrier network. Although the signaling message routing of the present invention will apply to other types of networks, in the illustrated example, both networks are telephone networks.

In FIG. 1, a first local exchange carrier network 1 includes a number of end office switching systems providing connections between local communication lines coupled to end users telephone station sets. For convenience, only one end office 11 is shown. The first local exchange carrier network 1 also includes one or more tandem switching systems providing connections between offices. For convenience, only one tandem office 13 is shown. As such, the first telephone network consists of a series of switching offices interconnected by voice grade trunks, shown as solid lines. One or more trunks also connect the tandem 13 to one or more switches, typically another tandem office, in the second network 2.

Each switching office has SS7 signaling capability and is conventionally referred to as a signaling point (SP) in reference to the SS7 network. In the first network 1, each switching office 11, 13 also is programmed to recognize identified events or points in call (PICs). In response to a PIC, either office 11 or 13 triggers a query through the signaling network to an Integrated Service Control Point (ISCP) for instructions relating to AIN type services. Switching offices having AIN trigger and query capability are referred to as Service Switching Points (SSPs). The ISCP 17 is an integrated system shown in more detail in FIG. 9 and discussed more fully below.

The end office and tandem switching systems typically consist of programmable digital switches with CCIS communications capabilities. One example of such a switch is a 5ESS type switch manufactured by AT&T; but other vendors, such as Northern Telecom and Siemens, manufacture comparable digital switches which could serve as the SPs.

Within the first network 1, the common channel interoffice signaling (CCIS) network includes one or more Signaling Transfer Points (STPs) and data links shown as dotted lines between the STP(s) and the switching offices. A data link also connects the STP 15 to the ISCP 17. One or more data links also connect the STP(s) 15 in the network 1 to those in networks of other carriers, for example to the STP 25 in the network 2. The structure of an exemplary STP will be discussed in more detail below, with regard to FIG. 8.

Although shown as telephones in FIG. 1, the terminal devices can comprise any communication device compatible with the local communication line. Where the line is a standard voice grade telephone line, for example, the terminals could include facsimile devices, modems etc.

The network 2 is generally similar in structure to the network 1. The network 2 includes a number of end office SP type switching systems 21 (only one shown) as well as one or more tandem switching systems 23 (only one shown). The network 2 includes a CCIS network comprising one or more STPs 25 and data links to the respective SP type switching offices and to the CCIS system of other carriers networks.

In the illustrated example, the second network 2 is not a full AIN type network. The switching systems do not have full AIN trigger and query capabilities. The network 2 includes a Service Control Point (SCP) 27, but the routing tables utilized in that database are more limited than those in the ISCP 17. The switching systems 21, 23 can query the SCP 27 for routing information, but the range of trigger events are more limited, e.g. to 800 number call processing.

An end office switching system 11 or 21 shown in FIG. 1 normally responds to a service request on a local communication line connected thereto, for example an off-hook followed by dialed digit information, to selectively connect the requesting line to another selected local communication line. The connection can be made locally through only the connected end office switching system but typically will go through a number of switching systems. For example, when a subscriber at station X calls station Y, the connection is made through the end office switching system 11, the tandem offices 13 and 23 and the end office switching system 21 through the telephone trunks interconnecting the various switching offices.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in-band signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the originating end office switching system, switching system 11 in the present example, suspends the call and sends a message through the CCIS network to the end office switching system serving the destination telephone line, i.e. to a terminating end office 21. The terminating end office determines whether or not the called station Y is busy. If the called station is busy, the terminating end office 21 so informs the originating end office 11 via CCIS message, and the originating end office provides a busy signal to the calling station. If the called station Y is not busy, the terminating end office 21 so informs the originating end central office 11. A telephone connection is then constructed via the trunks and end offices (and/or tandem offices) of the network between the calling and called stations.

For an AIN type service, such as call redirection based on data stored in the ISCP 17, the end offices and/or tandems are SSP capable and detect one of a number of call processing events, each identified as a 'point in call' (PIC), to trigger AIN type processing. Specifically, in response to such a PIC, a tandem 13 or end office switching system 11 suspends call processing, compiles a call data message and forwards that message via common channel interoffice signalling (CCIS) links and one or more STPs 15 to an ISCP 17. If needed, the ISCP 17 can instruct the particular switching office to obtain and forward additional information. Once sufficient information has reached the ISCP 17, the ISCP 17 accesses its stored data tables to translate the received data into a call control message and returns the call control message to the switching office via the STP 15 and the appropriate CCIS links. The office uses the call control message to complete the particular call through the public switched network in the manner specified by the subscriber's data file in the ISCP 17.

The SCP 27 offers a similar capability in the network 2, but the range of service features offered by that database are more limited. Typically, the SCP 27 offers only 800 number calling services with a limited number of related call routing options. The triggering capability of the tandem 23 and end office 21 is limited to 800 number recognition. If the end office 21 is capable of 800 number recognition and CCIS communication with the SCP 27, as shown, then the office 21 launches a CCIS query to the SCP 27 in response to dialing of an 800 number at a station set Y. The SCP 27 translates the dialed 800 number into an actual destination number, for example the telephone number of station X, and transmits a CCIS response message back to end office 21. End office 21 then routes the call through the public network to the station X identified by the number sent back by the SCP 27, using CCIS call routing procedures of the type discussed above.

In accord with the present invention, the routing of at least some of the various CCIS messages discussed above is controlled by data stored in an SS7 routing database 30, sperate and apart from the STPs 15, 25. During CCIS message processing, one of the STPs recognizes a specified characteristic about the message as a 'Point in Routing' (PIR) event and queries the database 30 as to how to translate and/or route the message. To understand the message routing and query triggering of the present invention, particularly in the preferred embodiment, it will be helpful first to review the SS7 protocol.

Figure 2:
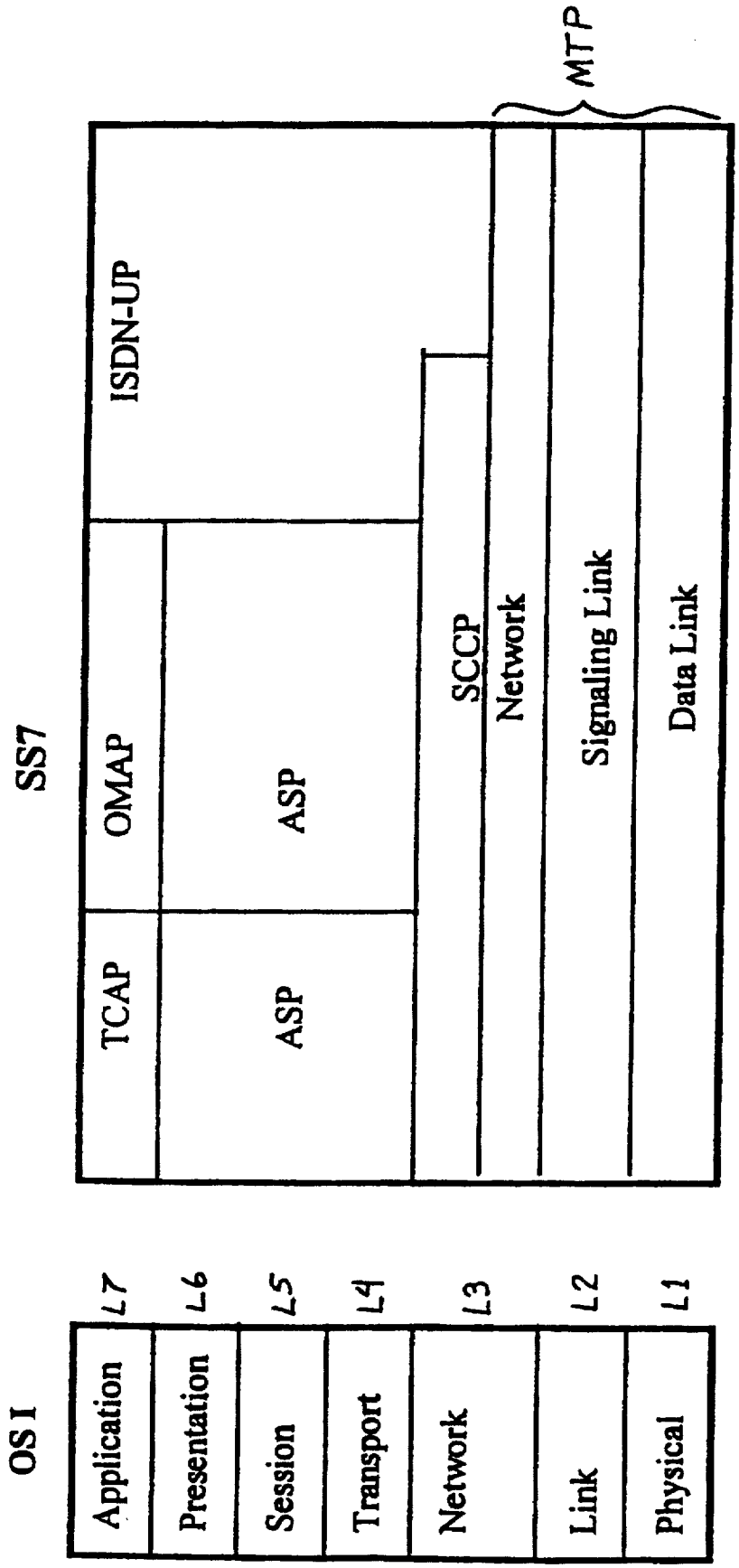
FIG. 2 depicts the protocol stack for SS7 and comparison thereof to the OSI model.

The International Standards Organization (ISO) Open Systems Interconnection (OSI) reference model specifies a hierarchy of protocol layers and defines the function of each layer in the network. FIG. 2 shows the OSI model and the relationship thereof to the protocol stack for SS7. The lowest layer defined by the OSI model is the physical layer (L1). This layer provides transmission of raw data bits over the physical communication channel through the particular network. The layer next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. The network layer provides capabilities required to control connections between end systems through the network, e.g. set-up and tear-down of connections.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities.

Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, typically for accessing databases such as SCPs. For example, TCAP specifies the format and content of an initial query message from an SSP to an SCP and various response messages from the SCP back to the SSP. ISDN-UP is the actual call control application protocol of SS7. ISDN-UP specifies the procedures for setting up and tearing down trunk connections utilizing CCIS signaling. ISDN-UP messages, for example, include an Initial Address Message (IAM), an Address Complete Message (ACM) and an Answer Message (ANM)

SS7 specifies an Application Service Part (ASP) for performing the functions of the presentation, session and transport layers for the TCAP and OMAP protocols. The lower four layers of the SS7 protocol correspond to the lower three layers (network, link and physical) of the OSI model. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

The SS7 network layer (lower portion of L3) routes messages from source to destination. Routing tables for the signaling network layer facilitate routing based on logical addresses. The routing functionality at this layer is independent of the characteristics of particular links.

The signaling link layer (L2) performs flow control, error correction and packet sequence control. The signaling data link layer (L1) is the actual physical connection between nodes of the CCIS network. The signaling data link layer in CCIS provides full duplex packet switched data communications. The signaling data link layer element provides a bearer for the actual signaling message transmissions. In a digital environment, 56 or 64 Kbits/s digital paths carry the signaling messages between nodes, although higher speeds may be used.

At the equivalent of the OSI network layer (L3), the SS7 protocol stack includes a Signaling Connection Control Part (SCCP) as well as the network layer portion of the MTP. SCCP provides communication between signaling nodes by adding circuit and routing information to SS7 messages. The SCCP routing information serves to route messages to and from specific applications. Each node of the signaling network, including the various switching offices and databases in each network, is assigned a 9-digit point-code for purposes of addressing signaling messages through the CCIS network. Both the SCCP protocol and the MTP processing utilize these point codes. In accord with the preferred embodiment, the present invention relies on SCCP processing of point code fields in the SS7 messages to detect 'Point in Routing' (PIR) events to query the database and subsequently translate point code related information to control actual routing of messages by the MTP processing layers.

For example, if the end office switching system 21 failed, a point in routing (PIR) code might be set against the destination point code value for that end office in one of the STPs, for example STP 25. When the party at station X calls station Y and the end office 11 sends a query message with the destination point code (DPC) for end office 21, the STP 25 would recognize the PIC and query the database 30 for routing instructions. The database 30 might return an instruction to transmit the query to the SCP 27. In the failed switching office example, the SCP 27 might return a network facility busy type message to the end office switching system 11 through the CCIS signaling network. In response, the end office 11 would supply a fast busy tone to station X.

The database 30 is separate from the STPs and switching offices. The database 30 connects to one or more of the STPs via an SS7 link similar to a link to an SCP or ISCP. The program running on the database 30 will be similar to that in an SCP, except that the routing translation information in the database 30 relates to CCIS routing rather than telephone traffic routing. In practice, the SS7 database may run as an application in a computer which also serves as an SCP or an ISCP of one of the carriers networks. Also, there may be a plurality of such databases 30. For example, the STPs 15 in network 1 may access one database 30, whereas the STPs 25 in the other network 2 may access a second SS7 database (not shown).

The preferred embodiment discussed below actually relies on processing of global title information carried in the fields used for the destination point code and the attendant translation thereof into an actual destination point code, as the PIR for triggering queries to the database 30. To facilitate understanding of such processing, it will be helpful to consider the format of SS7 messages and particularly the routing information contained in each message.

Figures 3, 4:
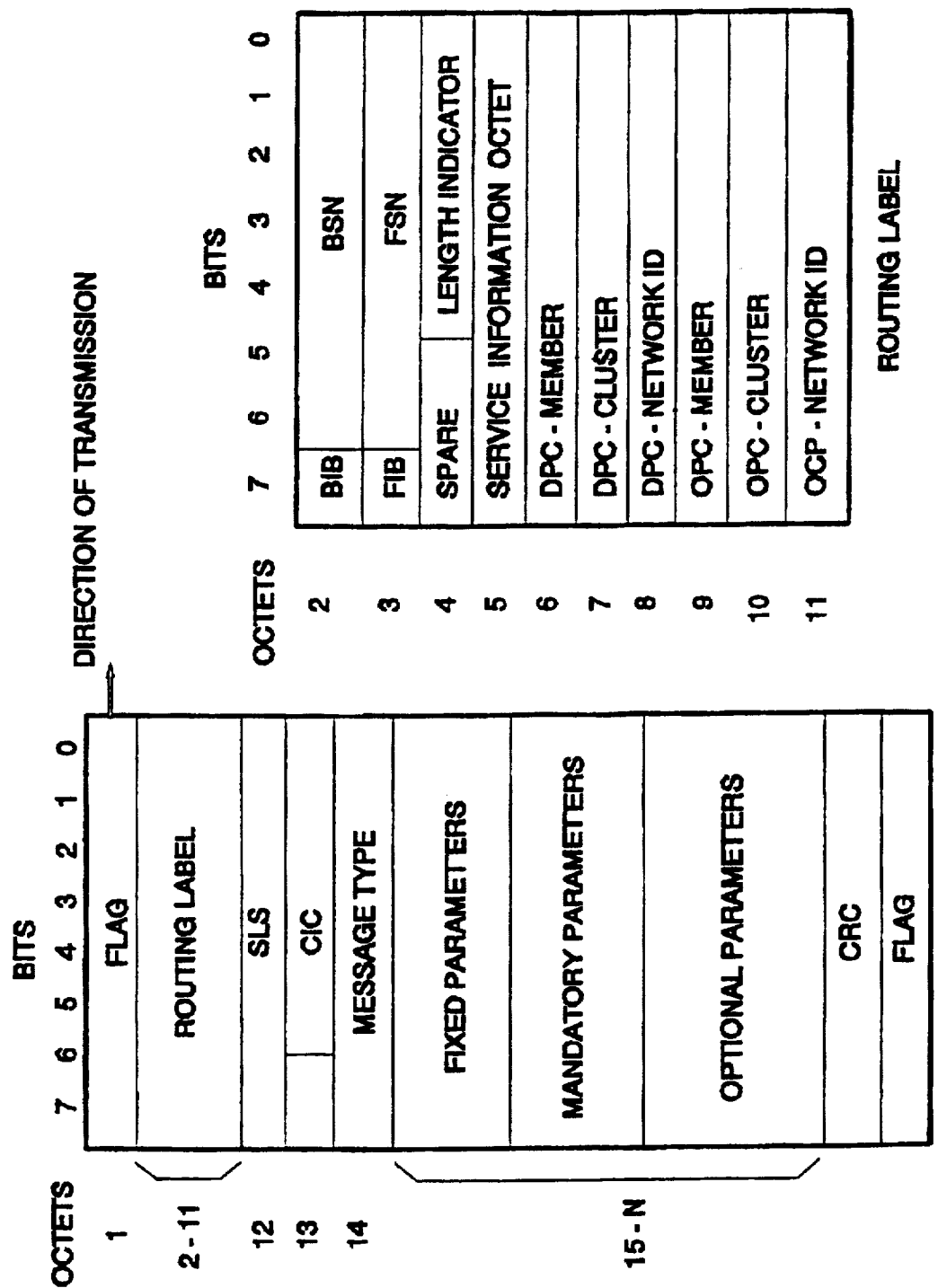
FIG. 3 illustrates in graphic form the layout of an SS7 protocol message packet.
FIG. 4 illustrates in graphic form the layout of the routing label portion of the SS7 protocol message packet shown in FIG. 3.

The SS7 messages traverse the network at all times. The messages themselves comprise digital serial messages that come into the STP. FIG. 3 provides a graphic illustration of an SS7 message packet. The first byte or octet of the message is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2-11 form a routing label as discussed later with regard to FIG. 4. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15-N contain the actual message, in the form of fixed parameters, mandatory parameters and optional parameters. The length of the mandatory parameters field and the optional parameters field are variable. There would be 16 other bits that have Cyclic Redundancy Codes (CRCs) in them and another flag which would constitute the end of the SS7 message (and typically the start of the next message). CRCs constitute a further error detection code which is a level 1 function in the protocol.

FIG. 4 is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly. The length of an SS7 message is variable, therefore octet 4 contains a message length indicator.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill in signals. The MSU indicator type SIO octet is formatted and encoded to serve as an address indicator, as discussed below.

The routing label includes fields for both destination related addressing and point of origin addressing. The destination or 'called party' address includes octets 6, 7 and 8. Octets 9-11 carry origination point code information, for example member, cluster and network ID information.

In the example shown in FIG. 4, the three octets of the called party address contain an actual destination point code (DPC) identified as DPC-member, DPC-cluster and DPC-network ID information. In operation, the translation tables stored in the STP cause the STP to actually route based on the DPC without translating any of the DPC octets into new values. The called party address octets (6-8), however, may carry other types of called party addressing information and receive different treatment by the STP. For example, these octets may carry a global title (GTT) and subsystem number (SSN) information.

To distinguish the types of information carried in octets 6-8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6-8.

The MTP processing of the STP routes SS7 packets based on point codes. When an STP receives a packet, the SCCP protocol processing in the STP examines the address indicator octet (5). If the indicator shows that the called party address octets (6-8) contain DPC bytes only, then there is no translation of the DPC bytes, and the MTP processing by the STP will route the packet based on the DPC value. If the address indicator (octet 5) shows that the called part address octets (6-8) include global title information, then the SCCP protocol layer processing in the STP translates the global title (GTT) into a destination point code (DPC) and inserts the destination point code into the SS7 packet. The subsequent MTP processing will route the packet using the translated DPC value. Although other PIR/triggering and translation by accessing the remote database could be used, the preferred embodiment of the present invention utilizes triggering and dips to the remote SS7 database 30 as part of the global title translation processing.

Figure 5:
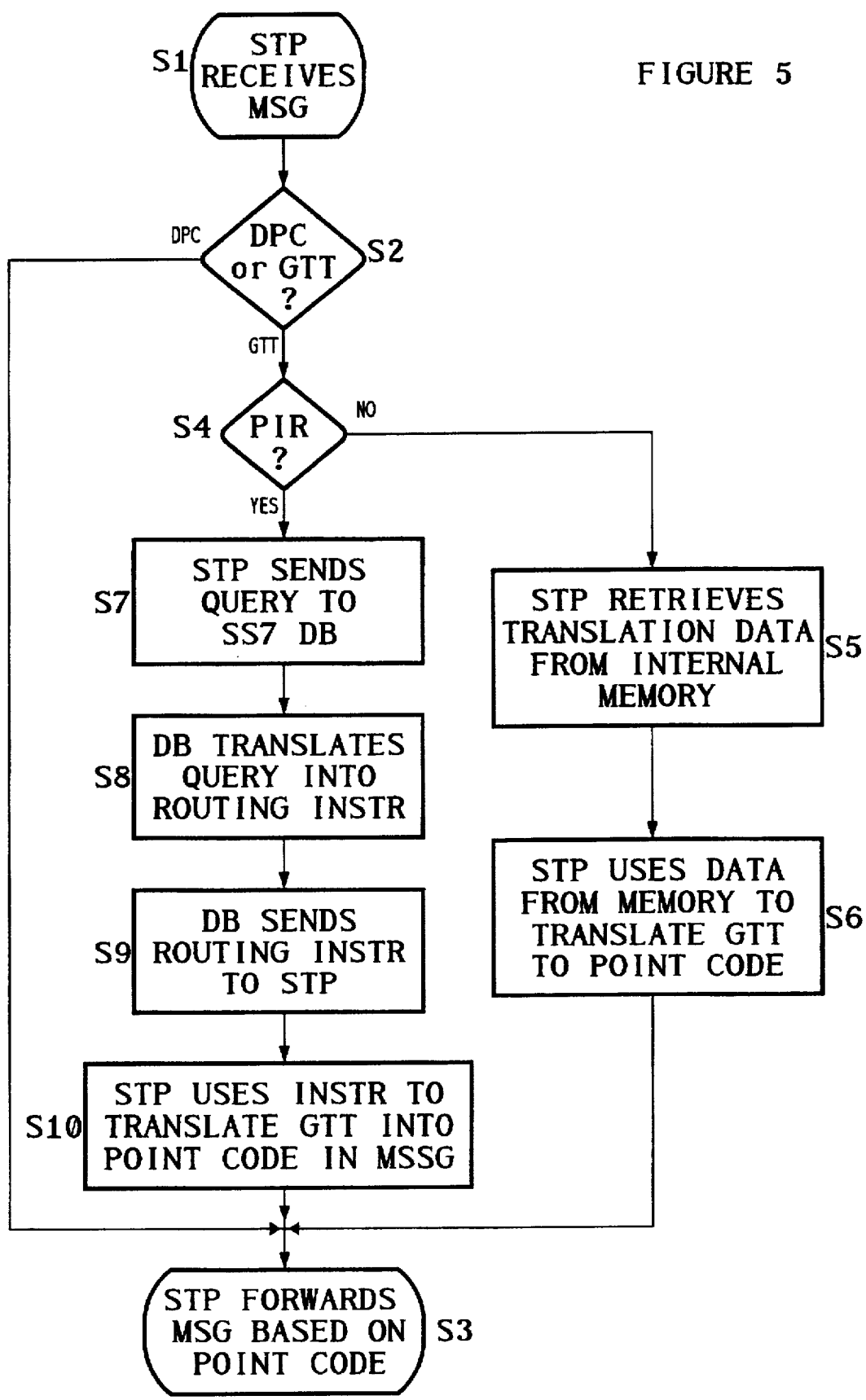
FIG. 5 is a simplified flow chart for use in explaining signaling message processing by an STP in accord with the present invention.

FIG. 5 is a high level process flow diagram of the SS7 type CCIS message processing by an STP, in accord with the preferred embodiment of the present invention. This preferred embodiment relies on PIR recognition as part of global title (GTT) translation processing at the SCCP protocol level.

In step S1, the STP receives an SS7 message, such as shown in FIGS. 3 and 4. As the STP processes the message at the SCCP level, the STP will determine whether the called party address field contains an actual destination point code (DPC) or a global title (GTT) value (step S2). If the called party address field contains a complete DPC value, no translation is needed. Processing branches to step S3, where the MTP processing of the STP forwards the message over an appropriate CCIS link based on the destination point code.

At step S2, if the SCCP layer processing in the STP determines from the address indicator that the called party address field contains a GTT value, a translation is necessary, therefore processing branches to step S4. At step S4 processing branches again based on whether or not there is a point in routing (PIR). In operation, the STP stores a translation for each possible GTT value. For some GTT values, the translation may be static, therefore the data in the internal memory table contains actual translation information. There is no PIR, therefore at step S5, the STP retrieves the GTT translation information from its internal memory. Using the data from internal memory, the STP translates the GTT value into an actual destination point code (step S6). At the SCCP protocol processing level, the STP replaces the information in the address indicator with a new indicator showing that the called party address contains an actual DPC value, and replaces the called party address octets with the destination point code produced by the translation from internal memory. Processing flows to step S3, and the STP forwards the message using the DPC value.

Returning to step S4, for certain messages, the information stored in the internal memory of the STP will result in detection of a PIR. In the preferred implementation, the STP stores a translation table for all GTT values; and for some GTT values, the internal translation table identifies a destination point code, as noted above. For other GTT values, however, the internal translation table stores a PIR code, therefore the step S4 now results in a suspension of the message translation and routing processing and a branch to step S7. The PIR code instructs the STP to launch a query message and provides a destination point code for the intended destination of that query. In the simplified example of FIG. 1, the destination point code would be an alias code residing on STP 15, and that STP translates the alias code to route the query message to SS7 database 30.

The query message preferably utilizes a standard TCAP application protocol query format. This query includes at least the GTT and the origination point code and may include a substantial amount of information relating to the SS7 message and the underlying call to which the SS7 message relates. For example, the TCAP query message to database 30 may specify the called and calling party numbers, time of day, etc.

The SS7 database 30 contains call processing records relating to routing through the CCIS network. In the present embodiment, the database comprises a GTT translation table. For those GTT values that will be referred to the database 30, the table translates those GTT values into destination point codes in a manner similar to the translation in the STP. The tables in database 30, however, are more extensive and dynamic. For example, the table in database 30 may provide that one GTT translation varies as a function of time and/or day of the week. As a more specific example, a GTT might result in a translation for routing to ISCP 37 from 9:00 AM to 5:00 PM Mondays through Fridays and routing to SCP 27 at all other times.

At step S7, the SS7 database translates the GTT information from the query message into a destination point code based on the relevant call processing record from the translation table in database 30. The database 30 formats the message as a TCAP call control type response message in SS7 packet form and transmits the message back to the particular STP that launched the query (step S9).

At step S10, the STP translates the GTT value into an actual destination point code in the SS7 message originally received in step S1, in this case using the destination point code value received from the database 30 in step S9. At the SCCP protocol processing level, the STP replaces the information in the address indicator with a new indicator showing that the called party address contains an actual DPC value, and replaces the called party address octets with the destination point code received from the database 30. Processing flows to step S3, and the STP forwards the message using the DPC value.

A more specific implementation of the communication and signaling networks is described below with regard to FIGS. 6A, 6B and 7-9. Afterwards, several specific call processing services, utilizing the present invention in the context of that specific network implementation, are discussed in some detail.

Figure 6A:
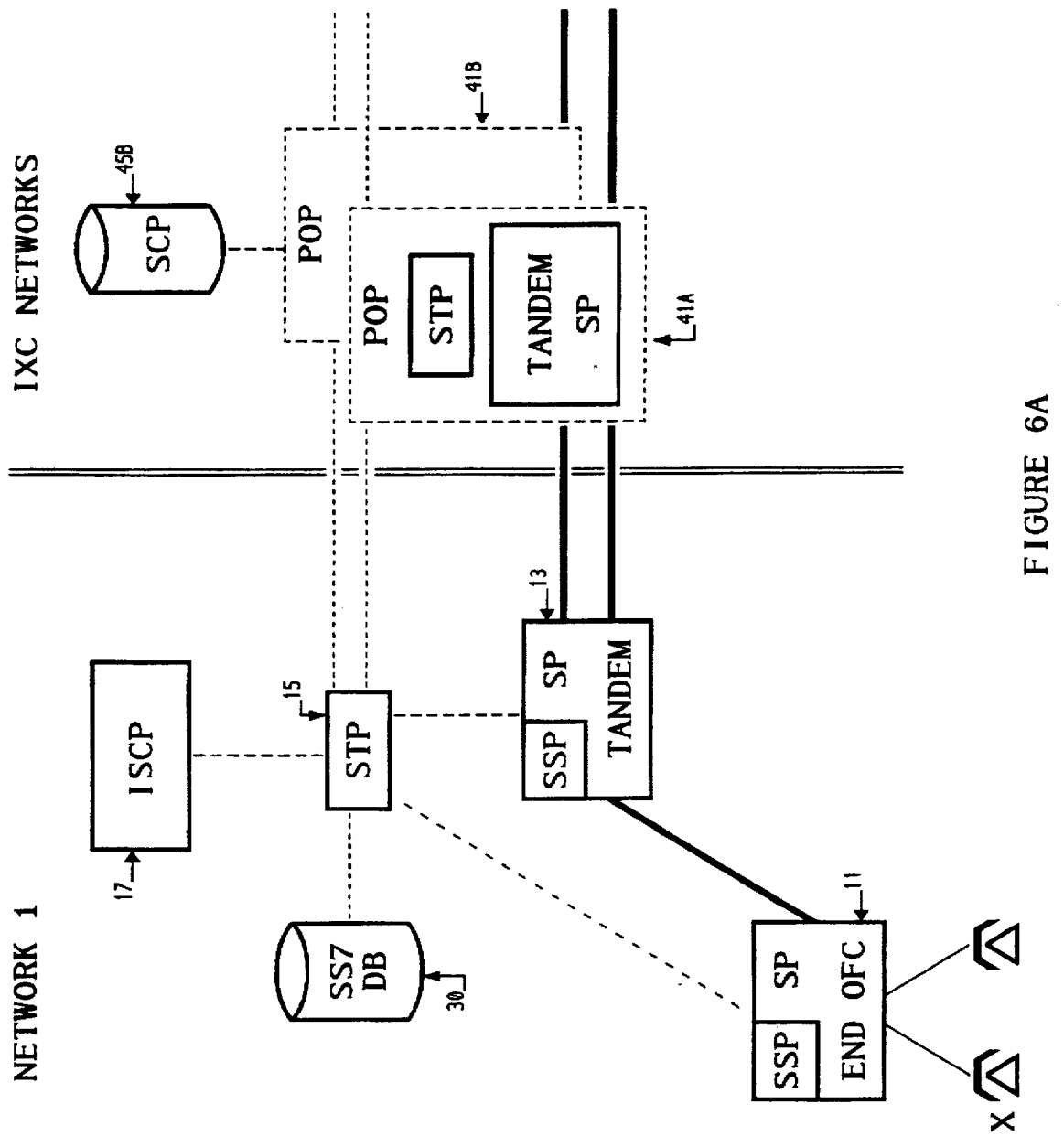
FIGS. 6A and 6B together show a somewhat more detailed block diagram of the network, i.e. including two interexchange carrier networks.
Figure 6B:
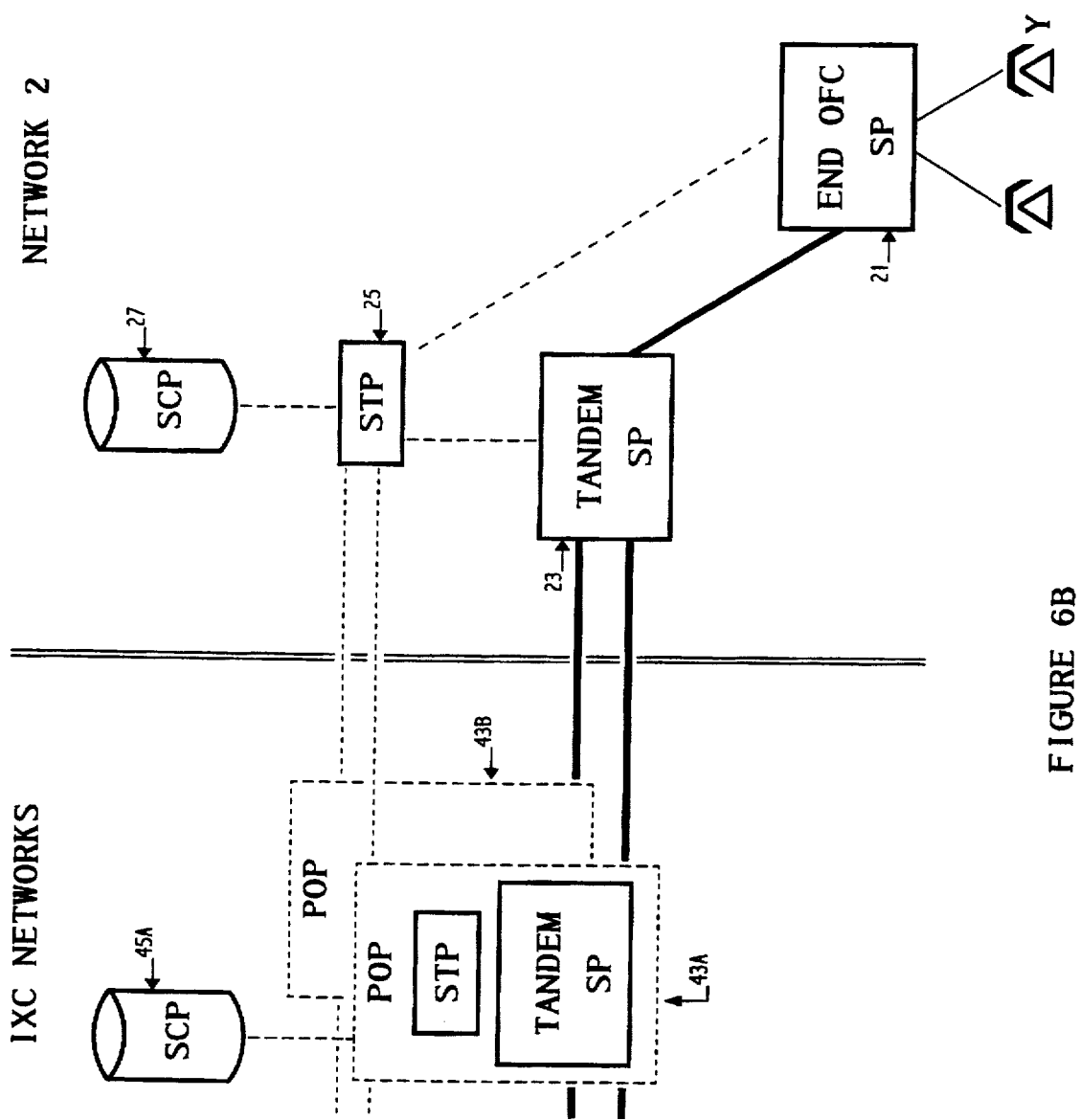

FIGS. 6A and 6B together show a public switched telephone network similar to that of FIG. 1. Again, the network actually includes two local exchange carrier networks, 1 and 2, and the structure and general methods of operation of those networks are identical to those of the networks 1 and 2 shown in FIG. 1. FIGS. 6A and 6B, however, add a high level functional representation of two competing interexchange carrier networks.

Each local exchange carrier network operates within boundaries of a defined Local Access and Transport Area (LATA). Current laws require that interexchange carriers, not local exchange carriers, must transport calls crossing the LATA boundaries, i.e. all interLATA calls. To transport calls from one LATA to another, each interexchange carrier network includes a point of presence (POP) 41A, 41B in the region of the first local exchange carrier network 1 and a point of presence (POP) 43A, 43B in the region of the second local exchange carrier network 2. Although not shown in detail, the interexchange carrier will operate a network of communication links and switching offices to provide transport between the POPs in different LATAs.

The interexchange carrier networks provide two-way transport for both communication traffic (e.g. voice calls) and signaling. For CCIS type processing, the POP in each region will include both a tandem type switch with at least SS7 signaling point (SP) capability as well as an STP. In each POP, the tandem connects to a switching office in the respective local exchange carrier network, and the STP connects to an STP of the respective local exchange carrier network. In the illustrated simplified example, the tandem switches in POPs 41A, 41B connect to the tandem 13 in network 1. The STPs in POPs 41A, 41B connect to the STP 15 in network 1. Similarly, the tandem switches in POPs 43A, 43B connect to the tandem 23 in network 2, and the STPs in those POPs connect to the STP 25 in network 2.

Typically, each interexchange carrier will operate an SCP database 45A, 45B. The SCP 45A, 45B connects to a signal transfer point (STP) at some point in each respective interexchange carrier's network. In the illustrated example, the SCP 45B connects to an STP in POP 41B, and the SCP 45A connects to the STP in POP 43A. The SCPs provide data translations for 800 number calling services and the like offered by the interexchange carriers. If an interexchange carrier chooses, one or more of the carrier's tandems may have full SSP capability, and the SCP could be replaced by an ISCP to offer AIN type services to the interexchange carrier's customers. The precise arrangement of switches, trunks, STPs, signaling links and SCPs or the like vary between interexchange carriers depending on the traffic load each transports, the sophistication of services provided, etc.

Figure 7:
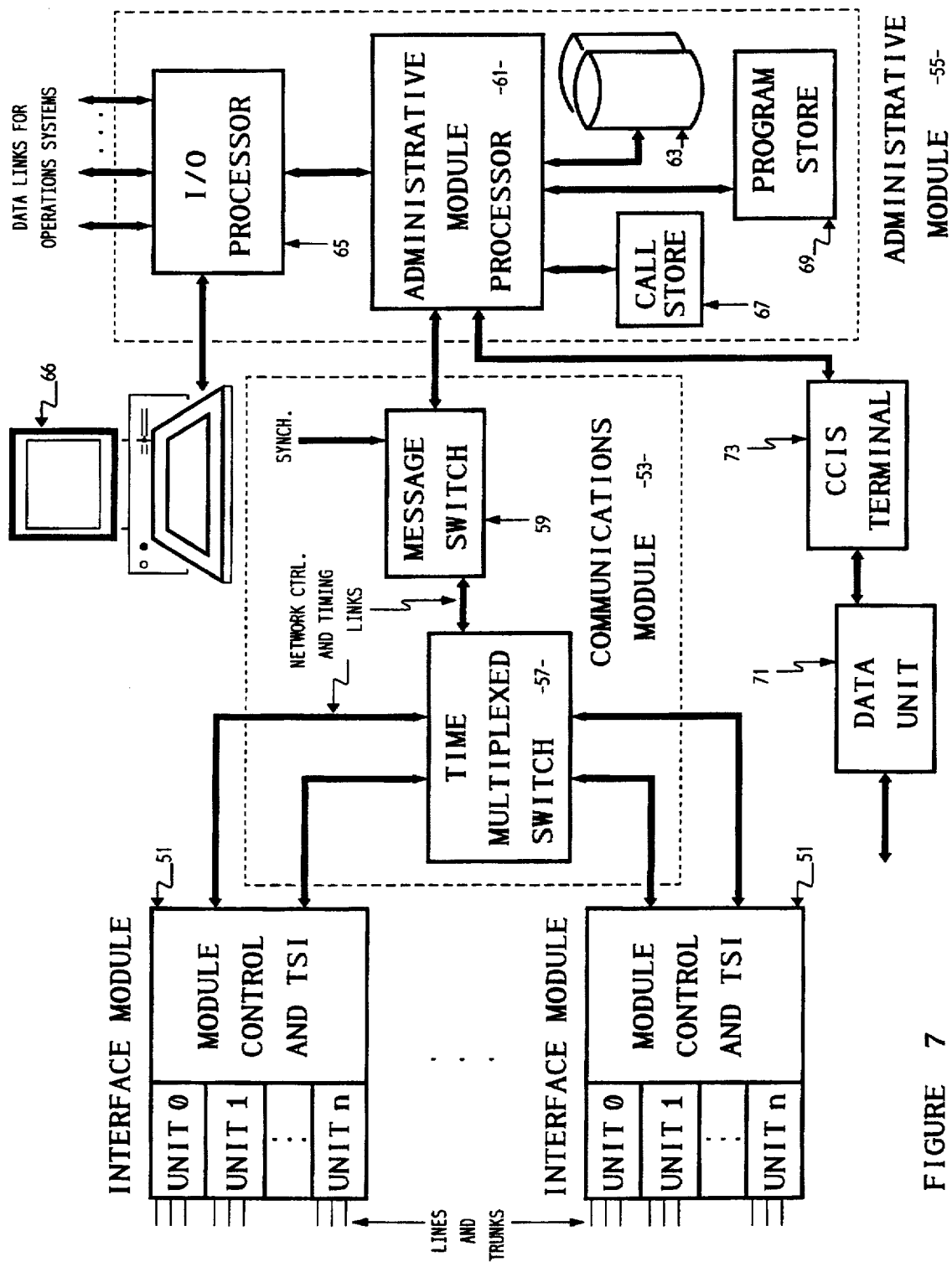
FIG. 7 is a more detailed diagram of one of the switching systems.

FIG. 7 is a simplified block diagram of an electronic program controlled switch which may be used as any one of the SP or SSP type switching offices in the systems of FIG. 1 or FIGS. 6A-6B. As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. The interface modules for the analog lines also include dial pulse detectors and dual tone multifrequncy (DTMF) detectors. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of operations of the switching office. The administrative module processor 61 communicates with the interface modules 51 through the communication module 53. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signalling link between the administrative module processor 61 and an STP of the SS7 signaling network, for facilitating call processing signal communications with other central offices (COs) and with one or more of the SCPs and/or the ISCP 17.

As illustrated in FIG. 7, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

Of particular note, the translation data in the disc storage 63 includes translation information needed to address messages for transmission through the signaling network. In particular, when the switch needs to send a message through the SS7 network to a particular node, the data from the disc storage 63 provides the global title and/or point code for the message destination.

Figure 8:
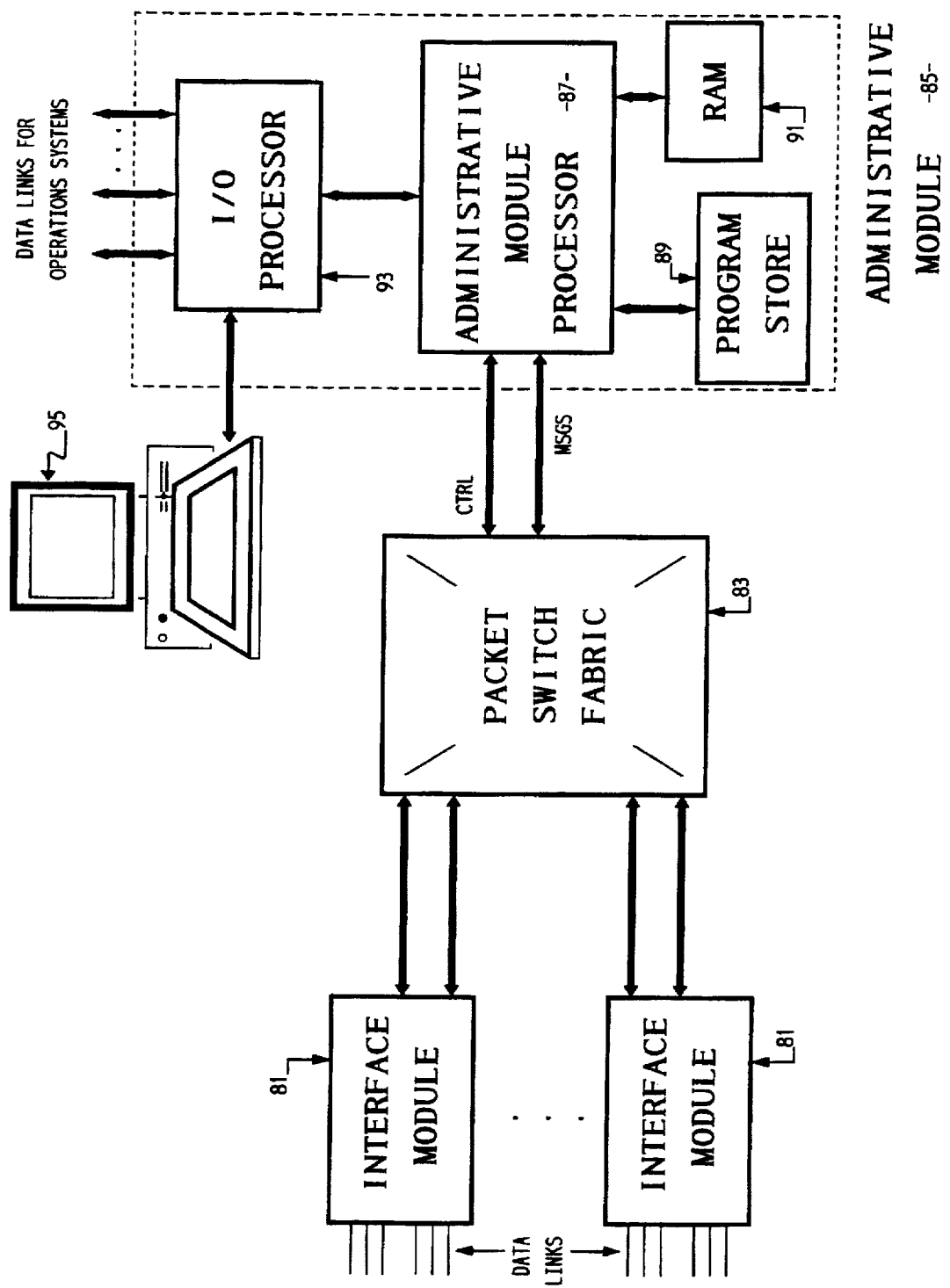
FIG. 8 is a functional block diagram of a Signaling Transfer Point (STP) in accord with the present invention.

FIG. 8 depicts the functional elements of one of the STPs shown in the networks of FIGS. 1, 6A and 6B. As shown, the STP comprises interface modules 81, a packet switch fabric 83 and an administrative module 85. The interface modules 81 provide the physical connections to the two-way data links to the switching systems, SCPs, ISCPs and other STPs. In certain STPs, such as STP 15, one of the interface modules connects to a data link to an SS7 database. Typically, these links provide two-way 56 kbits/s or 64 kbits/s virtual circuits between nodes of the CCIS signaling network. The modules provide a two-way coupling of SS7 data packets, of the type shown in FIG. 3, between the actual data links and the packet switch fabric. The packet switch fabric provides the actual routing of packets coming in from one link, through one of the interface modules 83 back out through one of the interface modules 81 to another data link. The packet switch fabric 83 also switches some incoming messages through to the administrative module 85 and switches some messages from the administrative module 85 out through one of the interface modules 81 to one of the data links, for example to communicate with an SS7 database 30.

The administrative module 65 includes an administrative module processor 87, which is a computer equipped with RAM 91 and a program store 89, for overall control of operations of the switching office. Although shown as a logically separate element, the program store 89 typically is implemented as memory within the computer serving as the administrative module processor 87. The administrative module processor 89 provides control instructions to and receives status information from the operation control element (not shown) within the packet switch fabric 83. The administrative module processor 87 also transmits and receives some messages via the packet switch fabric 83 and the interface modules 81. The administrative module 55 also includes one or more input/output (I/O) processors 65 providing interfaces to terminal devices for technicians such as shown at 95 in the drawing and data links to operations systems for traffic recording, maintenance data, etc.

The program store 89 stores program instructions which direct operations of the computer serving as the administrative module processor 87. The RAM 91 stores the translation tables used to control routing and/or processing of messages through the STP. The RAM may be implemented as a disc storage unit, but preferably the RAM comprises a large quantity of semiconductor random access memory circuits providing extremely fast access to information stored therein.

The ISCP 17 is an integrated system, as shown in FIG. 9. Among other system components, the ISCP 17 includes a Service Management System (SMS) 101, a Data and Reporting System (DRS) 105 and the actual database referred to as the Service Control Point (SCP) 103. The ISCP also typically includes a terminal subsystem referred to as a Service Creation Environment or SCE 102 for programming the database in the SCP 103 for the services subscribed to by each individual customer. The components of the ISCP 17 are connected by an internal, high-speed data network, such as a token ring network 107.

The SS7 database 30 may initially be implemented as an application program running on one of the separate SCPs or the SCP within ISCP 17. In future, as increasing numbers of services rely on the dynamic signaling message routing capability of the present invention, a separate stand-alone SCP or even a full ISCP may be used to implement the SS7 database. In any such implementation, the database program in the SS7 database 30 would emulate a call processing record database similar to those used in the SCPs or ISCP 30. Of particular note here, the SCP functionality of the particular computer implementing the SS7 database 30 stores the call processing records and/or translation tables used for control of the SS7 message routing in response to the detected point in routing (PIR) events.

To facilitate an appreciation of the operation and advantages provided by the dynamic signaling message routing of the present invention, a few call processing examples are discussed below with regard to the network and component elements shown in FIGS. 6A, 6B and 7-9. In this regard, consider first the simple example of a call from station X to station Y, wherein there will be no PIR event in the SS7 signaling message processing.

Each node of the signaling network, including the various switching offices and databases in each network, is assigned a 9-digit point-code for purposes of addressing signaling messages through the CCIS network. For purposes of discussion, assume that in FIG. 1 end office 11 has a point code of 246-103-001, tandem office 13 has a point code of 246-103-002, tandem office 23 has a point code of 255-201-103, and end office 21 has a point code of 255-201-104.

Consider now the simplest specific example of a call from station X to station Y wherein standard CCIS routing is to apply. The user at station X picks up his phone and dials the number of station Y. The administrative module processor 61 loads the subscriber profile information from disc storage 63 into an available register in call store 67. The number for station Y resides in end office 21. The SP end office 11 generates an Initial Address Message (IAM). The information in the register in call store 67, in this case, does not specify any special processing of the CCIS signaling messages relating to the call. The IAM message therefore would have the destination point code of end office 21, namely, point code 255-201-104. It would have an originating point code of end office 11, namely, 246-103-001, in addition to miscellaneous other information needed for call set-up such as the destination number of station Y. The end office 11 transmits the IAM message over a data link to the STP 15. The STP 15 looks at the message and determines that the message was not for it as an STP but rather is for end office 21.

In the preferred embodiment of the processing by the STPs discussed above relative to FIG. 5, there is no translation of the point codes and no triggering in response to any PIR event. The STP 15 therefore investigates possible routings to get to the correct end office 21 and routes accordingly.

In the simplified example shown in FIG. 1, the CCIS message intended for end office 21 goes through STP 25. The SS7 message includes a CIC code specifying the interexchange carrier selected by the caller, assume here that the CIC code identifies interexchange carrier A. The STP 15 forwards the message to the STP 25 through the STPs of the POPs 41A and 43A. Each of the interexchange carrier STPs and the STP 25 repeats the same procedure. Ultimately, the STP 25 determines that the message is for end office 21 and puts that message on the link to the end office 21.

End office 21 receives the IAM message which includes the called telephone number and determines whether or not the line is busy. If the line is not busy, the end office 21 rings the station Y and generates an Address Complete Message (ACM) to indicate that it received the request for a call and that the number is not busy. The return ACM message includes the CIC code received in the IAM message, in this case the CIC code of interexchange carrier A. The ACM message is sent back by simply reversing the point codes. Now the destination point code is that of end office 11 (246-103-001), and the originating point code is that of end office 21 (255-201-104). The message goes back to the end office 11 through the STPs, to indicate that the IAM was received and processed. In particular, the return message (ACM in this case) includes an actual destination point code (the origination point code from the IAM message) and therefore does not result in translation or PIR triggering. In response to the ACM message, the originating end office 11 applies a ring back tone signal to the line to station X.

As soon as the phone is answered at end office 21, that office sends an Answer Message (ANM) back to end office 11 through the STPs, including those of interexchange carrier A, indicating that the phone Y was picked up; and at that time the actual telephone traffic trunks are connected together through the tandems 13, 23, the tandems in POPs 41A, 43A and the trunks of the interexchange carrier A's network. Again, the return message (ANM in this case) includes an actual destination point code (the origination point code 246-103-001 from the IAM message) and therefore does not result in translation or PIR triggering. End office 11 connects the line to station X to the trunk to tandem 13, and end office 21 connects the line to station Y to the trunk to the tandem 23, so that communication is established. All such messaging may occur in about 600 milliseconds.

Consider again a specific example of a call from station X to station Y, but here assume that the subscriber has chosen a service which includes the PIR routing triggering and attendant database dip to control CCIS message routing. In the present example, the database provides a dynamic interexchange carrier selection, e.g. at different times.

The user at station X again picks up his phone and dials the number of station Y. At end office 11, the administrative module processor 61 loads the subscriber profile information from disc storage 63 into an available register in call store 67. The SP end office 11 generates an Initial Address Message (IAM). In the present example, the data now in the register in call store 67 indicates that the CCIS message for office 21 should use a particular global title (GTT) value. As such, the IAM message now includes a global title (GTT) value assigned for dynamic routing of calls to the particular end office. The IAM message again includes the originating point code of end office 11, namely, 246-103-001. The end office 11 transmits the IAM message over a data link to the STP 15. The administrative module processor 87 in the STP 15 examines the routing label in the signaling message and notes the presence of a global title. The administrative module processor 87 accesses translation data for the global title value stored in RAM 91. In this example, the translation data for the global title includes a PIR code. In response to the PIR code, the administrative module processor 87 formulates a TCAP query and sends that message through the packet switch fabric 83 and the appropriate interface module 81 to the data link to the SS7 database 30.

The database 30 receives the TCAP query from the STP 15 and uses the global title value contained in that query to access the appropriate call processing record in its data tables. In the present example, assume that the caller has elected to use interexchange carrier A from 9:00 AM to 5:00 PM on weekdays and to use interexchange carrier B at other times, to take advantage of the lowest rate possible at different times. If the TCAP query message arrives at the SS7 database 30 within a time allotted to carrier A, then the database 30 translates the global title into the destination point code 255-201-104 for the end office 21 and returns that code together with a CIC code for carrier A to the STP 15. The STP 15 reformulates the IAM message to include the destination point code 255-201-104 and the CIC code for carrier A. The STP then forwards the IAM message, and call processing by the various network elements proceeds exactly as in the preceding example.

However, if the TCAP query message arrives at the SS7 database 30 within a time allotted to carrier B, then the database 30 translates the global title into the destination point code 255-201-104 for the end office 21 and returns that code together with a CIC code for carrier B to the STP 15. The STP 15 reformulates the IAM message to include the destination point code 255-201-104 and the CIC code for carrier B. The STP 15 forwards the reformulated IAM message to the STP 25, but now through the STPs of the POPs 41B and 43B. The interexchange carrier STPs and the STP 25 repeat the message routing procedure, but now the IAM message contains an actual destination point code. The message does not contain a global title (GTT) value, therefore these subsequent STPs do not translate the routing label data and do not detect any PIR event to query the SS7 database 30. The subsequent STPs therefore just pass the message on to the next node through the CCIS signaling network. Ultimately, the STP 25 determines that the message is for end office 21 and puts that message on the link to the end office 21.

End office 21 receives the IAM message which includes the called telephone number and determines whether or not the line is busy. If the line is not busy, the end office 21 rings the station Y and generates an Address Complete Message (ACM) to indicate that it received the request for a call and that the number is not busy. That message is sent back by simply reversing the point codes. The return ACM message, however, includes the CIC code received in the IAM message, and in this case the CIC code is that of interexchange carrier B. Again, the destination point code is that of end office 11 (246-103-001), and the originating point code is that of end office 21 (255-201-104). The message goes back to the end office 11, but now through the STPs in the POPs 43B, 41B, to indicate that the IAM message was received and processed. The return message (ACM in this case) includes an actual destination point code (the origination point code 246-103-001 from the IAM message) and therefore does not result in translation or PIR triggering by any of the STPs.

As soon as the phone is answered at end office 21, that office sends an Answer Message (ANM) back to end office 11 through the STPs, including those of interexchange carrier B, indicating that the phone Y was picked up; and at that time the actual telephone traffic trunks are connected together through the tandems 13, 23, the tandems in POPs 41B, 43B and trunks of the interexchange carrier B's network. Again, the return message (ANM in this case) includes an actual destination point code (the origination point code 246-103-001 from the IAM message) and therefore does not result in translation or PIR triggering by any of the STPs. End office 11 connects the line to station X to the trunk to tandem 13, and end office 21 connects the line to station Y to the trunk to the tandem 23, so that communication is established.

The translation and routing functionalities of the STPs are substantially similar for calls receiving AIN treatment through an ISCP or 800 number call processing and the like through an SCP. A simple example is given below for one such service without PIR type triggering on the CCIS message followed by an example of essentially the same service with PIR type triggering on the CCIS message.

In the present example, assume that a customer at station Y has subscribed to an INWATS type 800 number service offered by interexchange carrier A. The translation data for converting the dialed 800 number into the telephone number for station Y (or alternate destinations) resides on that carrier's SCP 45A. Now when the caller at station X dials the particular 800 number, the end office 11 suspends call processing and launches a query for routing information.

More specifically, the end office 11 formulates an appropriate TCAP query message in SS7 format. Of particular note, this SS7 message will include the six dialed digits (800-NXX) as global title (GTT) information. The end office 11 forwards this message to the STP 15 over a CCIS data link.

In the present example, assume that the GTT value does not have a related PIR code defined in the translation tables within the STP 15. The translation table in the STP 15 instead contains a destination point code for routing messages to the SCP 45A. The STP 15 therefore translates the GTT into the point code, replaces the called party address with the resultant point code information and forwards the message to the STP in the POP 41A. That STP in turn routes the message through the CCIS network of carrier A to the SCP 45A.

The SCP 45A translates the dialed 800 number, contained in the TCAP application portion of the message, into the actual telephone number of a destination station, using customer selected routing information stored in the data tables in SCP 45A. In the present simplified example, assume that the translation in SCP 45A provides the telephone number of station Y. The SCP 45A formulates a TCAP call control type response message and formats that message into SS7 protocol. Of particular note, the message received by the SCP 45A included the origination point code of the end office 11 (246-103-001). The SCP 45A now uses that point code as the destination point code in the SS7 response message. The SCP 45A transmits the response message back through the CCIS links and the STPs to the end office 11. Because there is no global title information in the response message, the STPs use the destination point code and simply pass the message through to the next node of the signaling network.

When the end office 11 receives the TCAP response message, that office replaces the dialed digit information (800 number) in the register in call store 67 currently assigned to processing of the call from station X with the number from the TCAP response message, in the example, the number for station Y. Using that number as dialed digit information, the end office 11 initiates call processing to route the call to station Y, in the exact same manner as in the above examples wherein the caller at station X actually dialed the telephone number of station Y.

Essentially similar processing by the STP(s) 15 will result in routing of TCAP messages between the switches 11 and 13 of the network 1 and the ISCP 17 for AIN type services, when there is no PIR established in one of the STPs. For some services utilizing the SCPs and/or the ISCP, the GTT translation in one of the STPs includes a PIR value and triggers query and response interaction with the SS7 database 30 to control routing of the SS7 messages. To facilitate understanding of such processing, another 800 number example is discussed below.

In the present example, assume that a customer at station Y now subscribes to two INWATS type 800 number services, one offered by interexchange carrier A, and the other one offered by interexchange carrier B. However, the customer wants only a single 800 number. This might be the case where the subscriber obtains a particularly sophisticated routing functionality from carrier A during normal business hours, e.g. with routing to any of several of the customer's offices and always to an available operator's position within such an office. The price for the sophisticated service would be correspondingly high. At other times, however, the customer uses the second carrier B's service to route to a single station Y at which she maintains a single twenty-four a day operator presence. In this case, the PIR responsive query and routing functionality provides dynamic routing of the query messages to the SCP of the correct carrier.

More specifically, when the caller at station X dials the particular 800 number, the end office 11 suspends call processing and launches a query for routing information. The end office 11 again formulates the TCAP query message in SS7 format, and this SS7 message includes the six dialed digits (800-NXX) as global title (GTT) information. The end office 11 forwards this message to the STP 15 over a CCIS data link.

In the present example, however, the GTT value corresponds to a PIR code defined in the translation tables within the STP 15 and information for routing a query from the STP 15 to the SS7 database 30. The administrative module processor 87 formulates a second TCAP query and sends that message through the packet switch fabric 83 and the appropriate interface module 81 to the data link to the SS7 database 30. The database 30 receives the second TCAP query from the STP 15 and uses the global title value contained in that query to access the appropriate call processing record in its data tables.

In the present example, assume that the TCAP query message arrives at the SS7 database 30 within a time allotted to carrier A, then the database 30 translates the global title into the destination point code for routing a signaling message to the SCP 45A and returns that code together with a CIC code for carrier A to the STP 15. The STP 15 reformulates the first TCAP query in SS7 message format to include the destination point code and the CIC code for carrier A. The STP 15 therefore translates the GTT into the point code, replaces the called party address with the resultant point code information from database 30 and forwards the message to the STP in the POP 41A. That STP in turn routes the message through the CCIS network of carrier A to the SCP 45A. From this point onward, call processing follows the flow of the above discussed example to route the 800 number call through interexchange carrier A's network to an identified destination station, such as station Y.

However, if the second TCAP query message arrives at the SS7 database 30 within a time allotted to carrier B, then the database 30 translates the global title into a destination point code and CIC code for routing signaling 5 messages to the SCP 45B. The database 30 therefore returns that destination point code and CIC code to the STP 15. The STP 15 reformulates the first TCAP query in SS7 message format to include the destination point code and the CIC code for carrier B. The STP 15 therefore translates the GTT into the point code, replaces the called party address with the resultant point code information from database 30 and forwards the message to the STP in the POP 41B. That STP in turn routes the message through the CCIS network of carrier B to the SCP 45B.

The SCP 45B translates the dialed 800 number, contained in the TCAP application portion of the message, into the actual telephone number of a destination station, using customer selected routing information stored in the data tables in SCP 45A. In the present example, assume that this translation in SCP 45B provides the telephone number of station Y, for simplicity of discussion. The SCP 45B formulates a TCAP call control type response message and formats that message into SS7 protocol. The modified first TCAP query message received by the SCP 45B included the origination point code (246-103-001) of the end office 11. The SCP 45B now uses that point code as the destination point code in the SS7 response message. The SCP 45B transmits the response message back through the CCIS links and the STPs to the end office 11. Because there is no global title information in the response message, the STPs use the destination point code and simply pass the message through to the next node of the signaling network.

When the end office 11 receives the TCAP response message, that office replaces the dialed digit information (800 number) in the register in call store 67 currently assigned to processing of the call from station X with the destination number from the TCAP response message, in the example, the number of station Y. Using that number as dialed digit information, the end office 11 initiates call processing to route the call to station Y, in the exact same manner as in the above examples wherein the caller at station X actually dialed the telephone number of station Y, albeit through the network of interexchange carrier B at the lower billing rate.

Essentially similar processing by the STP(s) 15 will result in dynamic routing of TCAP messages relating to AIN type services between the switches 11 and 13 of the network 1 and alternative routing information sources, including the ISCP 17 and one or more alternate databases, such as SCPs 45A, 45B and 27 when there is a PIR established in one of the STPs. For example, an interexchange carrier A that does not yet offer its own AIN services, such as call screening, could contract with the local exchange carrier operating network 1 to store the relevant call processing records for call screening on the ISCP 17. The dynamic routing of the present invention would allow messages for non-screening customers to go through the STPs in the normal manner, but calls for carrier A's customer's having screening would result in transmission of query messages to the ISCP 17.

The above examples, are just a few of the services that can be enhanced by operation of the dynamic CCIS signaling message routing capability of the present invention. Many other such services will be readily apparent to those skilled in the art.

For example, the wide use of the PIR trigger functionality in 800 service will facilitate portability of 800 numbers between different carriers. Whenever an 800 number query reaches the first STP, that STP would query the SS7 database to obtain information to route that query to the SCP/ISCP of the carrier currently serving calls to that 800 number.

As another example, the dynamic signaling message routing capabilities also facilitate redundant implementation of the SCPs and ISCPs. If one fails, then only the data in the SS7 database needs to be modified to reroute query messages to a backup SCP or ISCP.

As another example, when a subscriber moves, rather than move call processing records from the ISCP of the former local exchange carrier to the ISCP of the local exchange carrier serving the customer's new residence, the dynamic signaling message routing of the present invention would route query messages from switching offices and an STP in the new local exchange carrier network to the ISCP of the former local exchange carrier. This could allow moving subscribers to effectively take customized telephone services, such as complex call screening lists, with them. One number follow-me type routing services, such as used for personal communications services, also would be portable from area to area and carrier to carrier.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A signaling message routing method, comprising the steps of:

receiving a signaling message at a transfer point from a first node of a signaling network, said signaling message relating to control of a communication network;

in response to receipt of the signaling message, determining if a parameter value relating to the signaling message meets a predetermined criteria, and in response thereto transmitting a query message for routing information from the transfer point to a database separate from the transfer point and receiving the routing information in the transfer point from the database; and transmitting the signaling message from the transfer point to a second node of the signaling network in accord with the received routing information.

2. A method as in claim 1, wherein the step of transmitting and receiving comprises:

formulating the query message to contain information relating to the parameter value;

transmitting the query message from the transfer point to the database;

utilizing information in the database to translate the information relating to the parameter value into the routing information;

formulating a response message containing the routing information; and transmitting the response message from the database to the transfer point.

3. A method as in claim 2, wherein:

the step of transmitting the query message comprises transmitting the query message through the signaling network; and the step of transmitting the response message comprises transmitting the response message through the signaling network.

4. A method as in claim 1, wherein the first and second nodes of the signaling network are switching offices of the communication network.

5. A method as in claim 4, wherein the switching offices are telephone switching systems.

6. A method of routing a signaling message through a transfer point, comprising the steps of:

receiving a signaling message in the transfer point from a node of a signaling network, said signaling message relating to control of a communication network;

analyzing a parameter value relating to the signaling message received in the transfer point;

if the analysis of the parameter value indicates that the parameter value satisfies a first predetermined condition, accessing translation data stored in the transfer point to obtain first routing information, and transmitting the signaling message from the transfer point through the signaling network in accord with the first routing information; and if the analysis of the parameter value indicates that the parameter value satisfies a second predetermined condition, accessing translation data in a database separate from the transfer point to provide second routing information to the transfer point, and transmitting the signaling message from the transfer point through the signaling network in accord with the second routing information.

7. A method as in claim 6, wherein the signaling message is a data packet in signaling system 7 protocol format.

8. A method as in claim 7, wherein the first predetermined condition is that the parameter value represents a destination point code contained in the signaling message.

9. A method as in claim 7, wherein the second predetermined condition is that the parameter value represents a global title of a predetermined value contained in the signaling message.

10. A method of routing signaling messages through a transfer point, comprising the steps of:

receiving a first signaling message at the transfer point from a node of a signaling network, said first signaling message relating to control of a communication network;

accessing data stored in the transfer point to obtain first routing information;

transmitting the first signaling message from the transfer point through the signaling network in accord with the first routing information;

receiving a second signaling message at the transfer point from a node of a signaling network, said second signaling message relating to control of the communication network;

in response to receipt of the second signaling message, accessing translation data in a database separate from the transfer point to provide second routing information to the transfer point; and transmitting the second signaling message from the transfer point through the signaling network in accord with the second routing information.

11. A method as in claim 10, wherein the first routing information specifies a first destination node of the signaling network, and the second routing information specifies a second destination node of the signaling network.

12. A method as in claim 11, wherein the first and second destination nodes are databases containing information for controlling routing of calls through the communication network.

13. A method of routing a signaling message, comprising the steps of:

receiving the signaling message at a transfer point from a node of a signaling network, said signaling message relating to control of a communication network;

in response to receipt of the signaling message, accessing routing data in a database separate from the transfer point to supply routing information to the transfer point; and transmitting the signaling message from the transfer point through the signaling network in accord with the routing information.

14. A method as in claim 13, wherein the step of accessing routing data comprises:

formulating a query message containing information relating to a parameter of the signaling message;

transmitting the query message from the transfer point to the database;

utilizing information in the database to translate the information relating to the parameter into the routing information;

formulating a response message containing the routing information; and transmitting the response message from the database to the transfer point.

15. A method as in claim 14, wherein the parameter comprises routing information contained in the signaling message.

16. A method as in claim 15, wherein the signaling message is in SS7 format, and the parameter comprises a global title value.

17. A method as in claim 13, wherein:
the communication network comprises a public switched telephone network; and
the signaling network comprises a common channel interoffice signaling network of the public switched telephone network.

18. A communication processing method, comprising the steps of:
receiving a request for a communication service at one of a plurality of switching offices of a communication network providing services through communication links;
transmitting a first signaling message including information relating to the request for a communication service to a transfer point of a signaling network separate from the communication links;
in response to receipt of the first signaling message at the transfer point accessing routing data in a database separate from the transfer point and the switching offices;
transmitting the first signaling message from the transfer point through the signaling network in accord with the routing information to a node on the signaling network;
in response to the first signaling message, transmitting a second signaling message including information needed to provide the requested service from the node through the signaling network to the one switching office; and
providing the requested communication service over at least one of the communication links in response to the information included in the second signaling message.

19. A method as in claim 18, wherein the communication network is a public switched telephone network.

20. A method as in claim 19, wherein the requested communication service is a telephone call through the public switched telephone network.

21. A method as in claim 20, wherein the information included in the second signaling message comprises a translated destination telephone number.

22. A method as in claim 20, wherein the information included in the second signaling message indicates that a called telephone line is not busy.

23. A method as in claim 18, wherein the node on the signaling network is another switching office of the communication network.

24. A method as in claim 18, wherein the node on the signaling network is a database storing information for controlling communication services provided by the switching offices of the communication network.

25. A common channel interoffice signaling network for carrying signaling messages between switching offices of a communication network, said signaling network comprising:
a signaling transfer point for routing signaling messages and for initiating queries for routing information in response to at least some signaling messages;
signaling links coupling the signaling transfer point to the switching offices, said signaling links being separate from links carrying traffic of the communication network; and
a database separate from the signaling transfer point providing routing information to the signaling transfer point in response to queries from the signaling transfer point, to control routing of the at least some of the signaling messages by the signaling transfer point.

26. A network as in claim 25, further comprising a service control point separate from the switching systems and the signaling transfer point, said service control point receiving at least some of the signaling messages from the signaling transfer point and providing call routing control instructions to one or more of the switching offices through the signaling links and the signaling transfer point in response to the received signaling messages.

27. A network as in claim 25, wherein the signaling transfer point comprises:
interface modules providing two-way data communications to a plurality of the signaling links;
a data switch for switching messages between the interface modules; and
a program controlled processor recognizing a predetermined event in the processing of at least one signaling message, in response thereto obtaining message routing information from the database, and controlling operation of the data switch to route the at least one signaling message in accord with the routing information.

28. A network comprising:
local communication lines;
a trunk circuit;
at least two separately located central office switching systems interconnected via the trunk circuit for selectively providing switched call connections between at least two of the local communication lines;
a signaling transfer point for routing signaling messages and for initiating queries for signaling message routing information in response to at least some signaling messages;
signaling links coupling the signaling transfer point to the central office switching systems, said signaling links being separate from the local communication lines and the trunk circuit; and
a database separate from the signaling transfer point and the central office switching systems providing the routing information to the signaling transfer point in response to queries from the signaling transfer point, to control routing of the at least some signaling messages by the signaling transfer point.

29. A network as in claim 28, further comprising a services control point, separate from the central office switching systems and communicating with the central office switching systems via signaling links and the signaling transfer point, comprising a database storing call processing data associated with a plurality of the local communication lines for control of switched call connections through one or more of the central office switching systems.

30. A network as in claim 28, wherein the signaling transfer point comprises:
interface modules providing two-way data communications to a plurality of the signaling links;
a data switch for switching messages between the interface modules; and a program controlled processor recognizing a predetermined event in the processing of at least one signaling message, in response thereto obtaining message routing information from the database, and controlling operation of the data switch to route the at least one signaling message in accord with the routing information.

31. A signaling transfer point comprising:

interface modules providing two-way data communications to a plurality of common channel interoffice signaling links;

a data switch for switching messages between the interface modules; and a program controlled processor recognizing a predetermined event in the processing of a signaling message, in response thereto obtaining message routing information from a database separate from the signaling transfer point, and controlling operation of the data switch to route the signaling message in accord with the routing information.

* * * * *